3,168,462
CATALYST DEMETALLIZATION
Henry Erickson, Park Forest, Ill., assignor, by mesne assignments, to Sinclair Research Inc., New York, N.Y., a corporation of Delaware
No Drawing. Filed July 7, 1961, Ser. No. 122,394
16 Claims. (Cl. 208—120)

This invention is a method for the removal of poisoning metals from synthetic gel hydrocarbon conversion catalysts. The method is useful in conjunction with hydrocarbon conversion processes where the feed is contaminated with nickel, iron and/or vanadium and comprises converting the metals to the sulfide form, and washing the catalyst with a solvent for the metal sulfide.

The method usually includes removing the catalyst containing metal contaminants from the hydrocarbon conversion system, sulfiding the catalyst with a sulfiding vapor at an elevated temperature, removing poisoning metal contaminants from the catalyst, for instance by the use of a basic aqueous solution containing ammonium ions and a chelating agent, and returning a catalyst of reduced poisoning metals content to hydrocarbon processing. This application is a continuation-in-part of my copending applications Serial No. 763,833, filed September 29, 1958, now abandoned; Serial No. 39,810, filed June 30, 1960, and Serial No. 53,623, filed September 2, 1960, now abandoned.

The demetallization process of this invention produces superior results in removing vanadium when the catalyst is given a high temperature treatment with molecular oxygen containing gas before sulfiding. Nickel removal is improved by imparting oxidizing characteristics to the solvent for the metal sulfide. This invention may be employed, for instance in procedures which use demetallization techniques described in copending applications, Serial No. 842,618, filed September 28, 1959, Serial No. 849,199, filed October 28, 1959, and Serial No. 19,313, filed April 1, 1960, all now abandoned.

Catalytically promoted methods for the chemical conversion of hydrocarbons include cracking, hydrocracking, reforming, hydroforming, etc. Such reactions generally are performed at elevated temperatures, for example, about 300 to 1200° F., more often 600 to 1000° F. Feedstocks to these processes comprise normally liquid and solid hydrocarbons which at the temperature of the conversion reaction are generally in the fluid, i.e., liquid or vapor, state and the products of the conversion frequently are lower-boiling materials.

In particular, cracking of heavier hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 750–1100° F., preferably about 850 to 950° F., at pressures up to about 2000 p.s.i.g., preferably about atmospheric to 100 p.s.i.g., and without substantial addition of free hydrogen to the system. In cracking, the feedstock is usually a mineral oil or petroleum hydrocarbon fraction such as straight run or recycle gas oils or other normally liquid hydrocarbons boiling above the gasoline range.

Solid oxide catalysts have long been recognized as useful in catalytically promoting conversion of hydrocarbons. For cracking processes, the catalysts which have received the widest acceptance today are usually activated or calcined predominantly silica- or silica-based, e.g., silica-alumina, silica-magnesia, silica-zirconia, etc., compositions in a state of slight hydration and containing small amounts of acidic oxide promoters in many instances.

The oxide catalyst may be alumina- or silica-based and ordinarily contains a substantial amount of a gel or gelatinous precipitate comprising a major portion of silica and at least one other material, such as alumina, zirconia, etc. These oxides may also contain small amounts of other inorganic materials, but current practice in catalytic cracking leans more toward the exclusion from the silica hydrate materials of foreign constituents such as alkaline metal salts which may cause sintering of the catalyst surface on regeneration and a drop in catalytic activity. For this reason, the use of wholly or partially synthetic gel actalysts, which are more uniform and less damaged by high temperatures in treatment and regeneration, is often preferable. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalyst may be only partially of synthetic material; for example it may be made by the precipitation of silica-alumina on clay, such as kaolinite or halloysite. One such semi-synthetic catalyst contains about equal amounts of silica-alumina gel and clay.

The manufacture of synthetic gel catalysts can be performed, for instance (1) by impregnating silica with alumina salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by a combination of hydrated silica with other hydrate bases as, for instance, magnesia, zirconia, etc. These synthetic gel-type catalysts are activated or calcined before use.

The physical form of the catalyst varies with the type of manipulative process to which it will be exposed. In a fixed-bed process, a series of catalytic reactors may be used, some being on stream and others in the process of cleaning, regeneration, etc. In circulating catalyst systems, such as those of the fluid catalytic and "TCC" processes, catalyst moves through a reaction zone and then through a regeneration zone. In the fluid process, gases are used to convey the catalyst and to keep it in the form of a dense turbulent bed which has no definite upper interface between the dense (solid) phase and the suspended (gaseous) phase mixture of catalyst and gas. This type of processing requires the catalyst to be in the form of a fine powder, generally in a size range of about 20 to 150 microns. In the "TCC" or "Thermofor" process the catalyst is in the form of beads which are conveyed by elevators. Generally these beads may range in size up to about ½″ in diameter. When fresh, the minimum sized bead is generally about ⅛″. Other types of process use other forms of catalyst such as tablets or extruded pellets.

One of the most important phases of study in the improvement of catalyst performance in hydrocarbon conversion is in the area of metals poisoning. Although referred to as "metals," these catalyst contaminants may be in the form of free metals or relatively non-volatile metal compounds. It is to be understood that the term "metal" used herein refers to either form.

Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. In addition to metals naturally present, including some iron, petroleum stocks have a tendency to pick up tramp iron from transportation, storage and processing equipment. Most of these metals, when present in a stock, deposit in a relatively non-volatile form on the catalyst during the conversion processes so that regeneration of the catalyst to remove coke does not remove these contaminants.

Of the various metals which are to be found in representative hydrocarbon feedstocks some, like the alkali metals, only deactivate the catalyst without changing the product distribution; therefore, they might be considered true poisons. Others such as iron, nickel, vanadium and copper markedly alter the selectivity and activity of cracking reactions if allowed to accumulate. A poisoned catalyst generally produces a higher yield of coke and hydrogen at the expense of desired products, such as gasoline and butanes. Since many cracking units are limited by coke burning or gas handling facilities, increased coke or gas yields require a reduction in conversion or throughput to stay within the unit capacity. For instance, it has been shown that the yield of butane, butylenes and gasoline, based on converting 60 volume percent of cracking feed to lighter materials and coke dropped from 58.5 to 49.6 volume percent when the amount of nickel on the catalyst increased from 55 p.p.m. to 645 p.p.m. and the amount of vanadium increased from 145 p.p.m. to 1480 p.p.m. in fluid catalytic cracking of a feedstock containing some metal contaminated stocks. Also, it has been shown that the yield of gasoline, based on feed disappearance, dropped from 93 to 82% when the laboratory-measured coke factor of a catalyst rose from 1.0 to 3.0 in commercial cracking of a feedstock containing some highly contaminated marginal stocks. This decreased gasoline yield was matched by an increase in gas as well as coke. If a poison is broadly defined as anything that deactivates or alters the reactions promoted by a catalyst then all of these four metals can be considered poisons. It is hypothesized that these metals when deposited on the surface of the cracking catalysts superimposed their dehydrogenation activity on the cracking reactions and convert into carbonaceous residue and gas some of the material that would ordinarily go into gasoline. The relatively high content of hydrogen in the gases formed by metals-contaminated catalysts is evidence that dehydrogenation is being favored. This unwanted activity is especially great when nickel and vanadium are present in the feedstocks.

Table I shows the effect of various levels of metals poisoning on the activity of a synthetic gel silica-alumina cracking catalyst. The activity was determined by putting each catalyst sample through a catalytic cracking activity test unit and analyzing the products of the cracking process. Sample 5027 contained 726 p.p.m. NiO and 2510 p.p.m. $V_2O_5$; sample 5047 contained 367 p.p.m. NiO and approximately 2000 p.p.m. $V_2O_5$; sample 5057 contained 525 p.p.m. NiO and 840 p.p.m. $V_2O_5$.

tions. A further alternative, demetallizing the catalyst, which avoids discarding of expensive catalyst and enables much lower grade, highly metals contaminated feedstocks to be used, is now possible in this invention.

Commercially used cracking catalysts are the result of years of study and research into the nature of cracking catalysis, and the cost of these catalysts is not negligible. The cost frequently makes highly poisoned feedstocks less desirable to use in cracking operations, even though they may be in plentiful supply, because of their tendency to damage the expensive catalysts. The expense of such catalysts, however, is justified because the composition, structure, porosity and other characteristics of such catalysts are rigidly controlled so that they may give optimum results in cracking. It is important, therefore, that removing poisoning metals from the catalyst does not jeopardize the desired chemical and physical constitution of the catalyst. Although methods have been suggested in the past for removing poisoning metals from a catalyst which has been used for high temperature hydrocarbon conversions, for example, the processes of U.S. Patents 2,481,253; 2,488,718; 2,488,744; 2,668,798 and 2,693,455, the process of this invention is effective to remove metals without endangering the expensive catalyst.

The process of this invention comprises reactivating a silica-based synthetic gel cracking catalyst poisoned with iron, vanadium or nickel individually or mixed by use in cracking a feedstock containing these metals as natural or "tramp" impurities, with a sulfiding agent at elevated temperatures apparently to obtain surface concentration of metal sulfides by converting at least a substantial amount of one or more of the poisoning metals to sulfide form and subsequently removing the metal sulfide by means of an appropriate solvent. The process may be repeated for further reductions in metals, to give the catalyst an activity profile more comparable to that of the virgin unpoisoned catalyst.

It is theorized that metals present in poisoned cracking catalysts are largely in solid solution in the catalyst matrix. The metal ions being mobile in solution at elevated temperatures, it has been found possible to concentrate the metals at the catalyst surface by treatment with hydrogen sulfide at elevated temperatures. The hydrogen sulfide converts the metal ions at the surface to metal sulfides which are insoluble in the matrix. Diffusion of metal ions transports additional metal to the surface where it is in turn converted to the sulfide. Thus a continuing process concentrates the metals as sulfides on the catalyst surface from where they are more readily removed. Prior to reusing the catalyst it can be calcined, say at temperatures usually in the range of about 700 to 1300° F., conveniently by addition to the cracking unit catalyst regenerator.

TABLE I

| Catalyst Sample | R.A. | D+L | G.F. | C.F. | Gas Grav. | $H_{PF}$[1] | Percent Gaso. | Percent Gas | Percent Coke | Percent Conv. | Gaso./ Gas | Gaso./ Coke |
|---|---|---|---|---|---|---|---|---|---|---|---|---|
| 400-5027 (calcined) | 33.3 | 32.3 | 2.28 | 2.24 | 0.80 | 326 | 19.6 | 14.3 | 4.7 | 38.6 | 1.37 | 4.16 |
| 400-5047 (calcined) | 39.6 | 35.5 | 1.72 | 1.46 | 1.02 | 208 | 22.0 | 16.2 | 3.7 | 41.9 | 1.36 | 5.95 |
| 400-5057 (calcined) | 29.6 | 30.1 | 1.94 | 1.63 | 0.99 | | 20.1 | 14.3 | 3.2 | 37.6 | 1.41 | 6.28 |
| 400-5027 (steamed) | 25.6 | 27.5 | 2.55 | 2.44 | 0.76 | 396 | 18.3 | 12.2 | 3.8 | 34.3 | 1.50 | 4.82 |
| 400-5047 (steamed) | 28.0 | 29.0 | 1.82 | 1.38 | 1.01 | 237 | 20.9 | 12.5 | 2.4 | 35.8 | 1.67 | 8.70 |
| 400-5057 (steamed) | 25.6 | 27.5 | 1.79 | 1.02 | | | 20.9 | 12.0 | 2.3 | 35.2 | 1.74 | 9.10 |

[1] Hydrogen producing factor.

An alternative to letting catalyst metals level increase and activity decrease is to diminish the overall metal content by raising catalyst replacement rates. Either approach, letting metals level increase, or increasing catalyst replacement rates, must be balanced against product value and operating costs to determine the most economic way of operating. The optimum metal level at which to operate any cracking unit will be a function of many factors including feedstock metal content, type and cost of catalyst, overall refinery balance, etc., and can be determined by a comprehensive study of the refinery's operations.

In this invention, the hydrocarbon petroleum oils utilized as feedstock for a conversion process may be of any desired type normally utilized in catalytic conversion operations, and may contain much higher amounts of poisoning metals than formerly were considered tolerable. The feedstock sometimes has as much as 3% metal poisons and the catalyst may be used as a fixed, moving or fluidized bed or may be in a more dispersed state. For typical operations, the catalytic cracking of the hydrocarbon feed would normally result in a conversion of about 50–60 percent of the feedstock into a product boiling in the gasoline boiling range. The catalytic conversion system also usually includes a regeneration procedure in which the catalyst is contacted periodically with free oxygen-containing gas in order to restore or maintain the activity of the catalyst by removing carbon. It will be understood that in this specification and claims "regeneration" refers to this carbon burn-off procedure. This invention is practiced on a catalyst after its removal from the hydrocarbon conversion system.

In the demetallization procedure of this invention sulfiding can be performed by contacting the poisoned catalyst with elemental sulfur vapors, or more conveniently by contacting the poisoned catalyst with a volatile sulfide, such as $H_2S$, $CS_2$ or a mercaptan. The contact with the sulfur-containing vapor can be performed at an elevated temperature generally in the range of about 500 to 1500° F., preferably about 800 to 1300° F. Other treating conditions can include a sulfur-containing vapor partial pressure of about 0.1 to 30 atmospheres or more, preferably about 0.5–25 atmospheres. Hydrogen sulfide is the preferred sulfiding agent. Pressures below atmospheric can be obtained either by using a partial vacuum or by diluting the vapor with gas such as hydrogen or nitrogen; higher pressures of $H_2S$ do not seem to give any advantage. The time of contact is that required to convert a significant amount of poisoning metal to sulfide and may vary on the basis of the temperature and pressure chosen and other factors such as the amount of metal to be removed. The sulfiding may run for, say up to about 20 hours or more depending on these conditions and the severity of the poisoning. Temperatures of about 900 to 1200° F. and pressures approximating 1 atmosphere or less seem near optimum for sulfiding and this treatment often continues for at least 1 or 2 hours but the time, of course, can depend upon the manner of contacting the catalyst and sulfiding agent and the nature of the treating system, e.g. batch or continuous, as well as the rate of diffusion within the catalyst matrix. After this step the catalyst may be purged and cooled by contact with nitrogen, etc., gas at a lower temperature.

Solvents for the metal sulfides fall generally into two groups of aqueous solutions: acid-acting and complexing. A requisite for metal sulfide removal is a solvent so selective as to remove the metals without significantly attacking the silica-alumina etc. of the catalyst. Acids containing an anion which forms soluble salts with nickel and/or vanadium and/or iron are suitable for use in water solution to dissolve the Ni and/or V and/or Fe sulfides from the surface of the catalyst. Inorganic acids, in dilute water solution, such as hydrobromic or hydroiodic or organic acids such as formic or acetic may be use. Strong inorganic acids such as sulfuric, hydrochloric or nitric acids as well as strong organic acids such as benzenesulfonic acid are preferably used in the form of their salts with a weak base such as ammonia or an organic amine, in order to prevent damage to the catalyst itself.

Aqueous solutions containing cyanide or hexametaphosphate ions are useful in forming soluble complexes with the poisoning metals. The process of the invention may remove poisoning metal from the sulfided catalyst by dissolving the metal as a chelate from the catalyst without significantly attacking the silica-alumina, etc. of the catalyst. Organic sequestering agents, such as ethylene diamine tetraacetic acid (EDTA), etc. have been found useful in removing the sulfided metals since they form soluble chelate complexes with the metals and effectively retard redeposition of the poisoning metals on the catalyst surface once they are brought into solution. Preferably a basic aqueous solution of the chelating agent is used for this purpose. Ammonium salts have an advantage in that the ammonium group forms very soluble amine complexes with the poisoning metals usually encountered, so that ammonium salts of strong acids, especially ammonium chloride of for instance about 0.1 to 1 molar, are preferred materials for use in aqueous solution to dissolve the poisoning metal sulfides. Of the organic chelating agents, two groups are economically feasible for use to make the solution used in this process: The amino polycarboxylic acids such as ethylene diamine tetraacetic acid (EDTA) and the hydroxy carboxylic acids such as gluconic acid, citric acid and tartaric acid. The chelating agents which are employed in this invention contain oxygen and frequently nitrogen as well. The most popular chelating agent is ethylene diamine tetraacetic acid; another commercial product known to be effective to chelate heavy metal ions is N-hydroxy-ethylethylene diamine triacetic acid.

Other natural and synthetic products are reported in the literature as effective to chelate heavy metal ions, such as palacatonic acid and palconic acid, triethanolamine in alkaline solutions, polyethylene polyamino acids such as triethylene tetraamine tetraacetic acid and its homolog amino acids, dextrin in an alkaline medium, certain epoxyamino acetic acid salts, amino derivatives of N-alkyl substituted aspartic acids and their functional derivatives and triammonium salts of mono-isopropanol ethylene diamine triacetic acid.

The chelating solution preferably contains ammonium ions sufficient to provide a basic character, preferably a pH greater than about 7.5. The ammonium ions may be $NH_4^+$ ions or organic-substituted $NH_4^+$ ions such as methyl ammonium and quaternary hydrocarbon radical ammoniums. The aqueous solution can be prepared by addition of a dry reagent or a concentrated solution of the reagent to water. Ammonia or methylamine gas may be dissolved directly in water. The ammonium salts of ethylene diamine tetraacetic acid may be employed, but this compound is not always commercially available.

The reagent may be any water-soluble organic or inorganic ammonium compound such as ammonium carbonate, methylamine, etc. and the solution is preferably basic. An aqueous solution of ammonium hydroxide is highly preferred. The selected solute will be one which dissociates or ionizes in the aqueous solution and which can be washed away or which vaporizes or decomposes to vaporizable materials under catalyst regeneration or similar high temperature treatment. Even ammonium or amine compounds of limited water solubility are useable in this invention due to the small concentration of ammonium ion needed. The preferred solutions have a pH of about 8 to 11.

The chelating solution may be given oxidizing properties by dissolving therein an oxidizing agent such as hydrogen peroxide or hypochlorous acid in an amount sufficient to improve nickel removal. Other oxidizing agents such as sodium peroxide, chromic acid where a small residual $Cr_2O_3$ content in the catalyst is not significant, and similar oxidizing agents such as manganates, and permanganates, chlorites, chlorates and perchlorates, bromites, bromates and perbromates, iodites, iodates and periodates, are also useful. Chlorine, bromine or iodine themselves may be used. Also, the addition of oxygen or ozone to the chelating solution is effective and the solution is conveniently given oxidizing characteristics by merely pumping sufficient air into the slurry of sulfided catalyst in the chelating solution. EDTA and $NH_4OH$ are preferred chelating and ammonium components, respectively. About 0.1 to 10% chelating agent, based on catalyst, can be used in the solution. The preferred amount is about 0.5 to 2.5%. Slurry concentrations from about 5 to 40% solids are generally used in the chelating step. The amount of ammonium ion in the solution is sufficient to give the desired vanadium removal and will often be in the range of about 1 to 25 or more pounds per ton of catalyst treated. Five to fifteen pounds is the preferred ammonium range but the use of more than about 10 pounds does not appear to increase vanadium removal unless it increases pH.

The liquid phase solvent may be applied to the sulfided catalyst at any temperature from ambient temperature upwards. Elevated temperatures, approaching the boiling point of water, are preferred, since the solubility of the metal compounds and complexes formed usually increases with increasing temperature, and since heat tends to remove the $H_2S$ formed by the acid-reacting solvent from the solution. The temperature of the wash solution does not appear to be significant in the amount of vanadium removed, but may vary within wide limits say, from about 40–212° F., preferably about 180–212° F. Temperatures above 215° F. require pressurized equipment, the cost of which does not appear to be justified. The temperature, of course, should not be so high and the contact should not be so long as to seriously harm the catalyst. The time of contact also may vary within wide limits, so long as thorough contact between the catalyst and wash solution is assured. Very short contact times, for example, about a minute, are satisfactory, while the time of washing may last 2 to 5 hours or longer. Contact with the hot catalyst may be sufficient to raise the temperature of the solvent from ambient temperature to around the boiling point. During the treatment the catalyst should be stirred enough so that it is suspended in the solution. The chelating agent solution can be recycled after the removal from the catalyst by passage through a suitable ion exchanger.

As mentioned previously, the amount of vanadium removed by the chelating solution is improved by treating the catalyst before sulfiding with a molecular oxygen-containing gas at a high temperature. The treatment is preferably performed after regeneration of the catalyst which is a relatively quick procedure in most commercial catalytic conversion operations. For example, in a typical fluidized cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about six minutes and the oxygen content of the effluent gases from the regenerator is desirably less than about ½%. When later oxygen treatment is employed, the regeneration of any particular quantum of catalyst is generally regulated to give a carbon content of less than about 0.5%. Prior to oxygen treatment, subjecting the poisoned catalyst sample to magnetic flux may be found desirable to remove any tramp iron particles which may have become mixed with the catalyst.

Treatment of the regenerated catalyst with a molecullar oxygen-containing gas is described in copending application Serial No. 19,313, filed April 1, 1960, hereby incorporated by reference. In this treatment, the poisoned catalyst is contacted with molecular oxygen-containing gas for conversion of the metals, especially vanadium, to higher valence states. The contact with oxygen is performed at a temperature of about 1000° F. to 1600° F. and preferably at least about 50° F. higher than the regeneration temperature, that is, the average temperature at which the major portion of carbon is removed from the catalyst. Little or no effect on vanadium removal is accomplished by treatment at about 1000° F., even for an extended time. The upper limit, to avoid catalyst damage, will usually be below about 1800° F. The duration of the oxygen treatment and the amount of metals prepared by the treatment for later removal is dependent on the temperature and the characteristics of the equipment used. The length of the oxygen treatment may vary from the short time necessary to produce an observable effect in the later treatment, say, a quarter of an hour, to a time just long enough not to damage the catalyst. This may be as long as 24 hours. In general, the time is inversely variable with the temperature employed.

The oxygen-containing gas used in the treatment contains molecular oxygen as the essential active ingredient. The gas may be oxygen or a mixture of oxygen with inert gas, such as air or oxygen-enriched air. The partial pressure of oxygen in the treating gas may range widely, e.g., from about 0.1 to 30 atmospheres, but usually the total gas pressure will not exceed about 25 atmospheres. Preferably a temperature of about 1200 to 1400° F. and a gas containing 20–100% oxygen is employed.

After the solvent treatment, the catalyst can be washed with an aqueous medium to remove remaining soluble or dispersible components, preferably at least until there is substantially no trace of nickel, vanadium or iron in the wash effluent. Ambient temperatures can be used but temperatures of about 150° F. to the boiling point of water are helpful in increasing solubility. Pressures above atmospheric may be used but the results usually do not justify the additional equipment.

After the solvent treatment or after the final aqueous wash which may be used in the catalyst demetallization procedure, the catalyst is conducted to a hydrocarbon conversion system, for instance to the conversion reactor or catalyst regenerator, although it may be desirable first to dry a wet catalyst filter cake or filter cake slurry at say about 250 to 450° F. and also, prior to reusing the catalyst in the conversion operation it can be calcined, say at temperatures usually in the range of about 700 to 1300° F., conveniently by addition to the cracking unit catalyst regenerator. Such calcination temperatures are generally sufficient to decompose and/or volatilize any ammonium or chelating materials left on the catalyst. However, prolonged calcination of the catalyst at above about 1100° F. may sometimes be disadvantageous. Calcination removes free water, if any be present and perhaps some but not all of the combined water and leaves the catalyst in an active state without undue sintering of its surface. Inert gases frequently may be employed after contact with reactive vapors to remove any of these vapors entrained in the catalyst or to purge the catalyst of reaction products.

The demetallization procedure of this invention has been found to be highly successful when used in conjunction with fluidized catalyst hydrocarbon conversion systems to control the amount of metal poisons on the catalyst. When such catalysts are processed, a fluidized solids technique is recommended for these vapor contact demetallization procedures as a way to shorten the time requirements. Any given step in the demetallization treatment is usually continued for a time sufficient to effect a substantial conversion or removal of poisoning metal and ultimately results in a substantial increase in metals removal compared with that which would have been removed if the particular step had not been performed. After the available catalytically active poisoning metal has been removed, in any removal procedure, further reaction time has relatively little effect on the catalytic activity of the depoisoned catalyst, although further metals content may be removed by repeated or other treatments.

The actual time or extent of treating depends on various factors and is controlled by the operator according to the situation he faces, e.g., the extent of metals content in the feed, the level of conversion unit tolerance for poison, the sensitivity of the particular catalyst toward a particular phase of the demetallization procedure, etc. Also, the thoroughness of treatment of any quantum of catalyst in commercial practice is balanced against the demetallization rate chosen, that is, the amount of catalyst, as compared to the total catalyst in the conversion system proper, which is subjected to the demetallization treatment per unit of time. A high rate of catalyst withdrawal from the conversion system and quick passage through a mild demetallization procedure suffices as readily as a more intensive demetallization at a slower rate to keep the total of poisoning metal in the conversion reactor within the tolerance of the unit for poison.

The catalyst to be treated may be removed from the hydrocarbon conversion system—that is, the stream of catalyst which in most conventional procedures is cycled between conversion and regenerating operations—before the poison content reaches about 5000 to 10,000 p.p.m., the poisoning metals being calculated as their common oxides. Generally, at least about 250 or 500 p.p.m. poisoning metal will be accumulated on the catalyst before demetallization is warranted. A suitable amount, generally a very small portion of the catalyst is removed from the hydrocarbon conversion system and given the oxygen treatment after the oxidation regeneration which serves to remove carbonaceous deposits. With a continuously circulating catalyst stream, such as in the ordinary "fluid" system this may conveniently be done by the intermittent or continuous removal of a slip-stream of catalyst from the regenerator stand-pipe. The severity of regeneration is generally such that the catalyst sent to demetallization contains not more than about 0.5% carbon. Where the catalyst is sent to the high temperature treatment with molecular oxygen-containing gas before it is substantially carbon free, the length of oxygen treatment, as recited above, is reckoned from the time that the catalyst reaches the substantially carbon-free state, that is the state where little, if any, carbon is burned or oxygen consumed even when the catalyst is contacted with oxygen at temperatures conducive to combustion.

The amount of Ni, V or Fe removed in practicing the procedures outlined or the proportions of each which are removed may be varied by proper choice of treating conditions. It may prove necessary, in the case of very severely poisoned catalysts, to repeat one or more treatments to reduce the metals to an acceptable level, perhaps with variations where one metal is greatly in excess. A further significant advantage of the process lies in the fact that the overall metals removal operation, even if repeated, does not unduly deleteriously affect the activity, selectivity, pore structure and other desirable characteristics of the catalyst.

In practice the process could be applied in a refinery by removing a portion of catalyst from the regenerator or regenerator standpipe of the cracking system after a standard regeneration treatment to remove a good part of the carbon, and heating this portion of the catalyst inventory preferably at least about 50° F. higher than the average regeneration temperature, in air for the length of time found to be sufficient for vanadium removal without catalyst damage. Then the catalyst is maintained in a hydrogen sulfide or a hydrogen sulfide-inert gas mixture for one to three hours at temperatures approximating 1050° F. The sulfiding gas may be purged from the catalyst by an inert gas, perhaps at a cooler temperature, and treated with the aqueous solvent solution. The treated catalyst can be returned to the unit, for example, to the regenerator, reducing greatly the new catalyst requirement. The apparatus used to perform the process of the invention may be suitable for conducting part or all of the procedures with fluidized beds of finely divided catalyst in the various operations.

The following examples are illustrative of the invention but should not be considered limiting. Qualitative analyses used in Example I to VII are those shown in "Spot Tests, Vol. I, Inorganic Applications," Fritz Feigl; Elsevier Publishing Co. (1954).

*Example I*

A 15 g. sample of 400–5010, a synthetic gel silica-alumina fluid type cracking catalyst poisoned to 726 p.p.m. NiO and 2510 p.p.m. $V_2O_5$ and 0.36% Fe by use in a pilot plant operation cracking a petroleum gas oil hydrocarbon stock containing tramp iron as well as nickel, vanadium and iron naturally present in the feedstock was leached three times with 75 ml. portions of 0.75 M $NH_4Cl$ solution, each for one hour at 180–200° F. The catalyst was filtered and washed free of chloride between each leaching. The first filtrate showed a trace of Ni by dimethylglyoxime test. The second and third showed no metals other than a very faint trace of Al. The catalyst analyzed 705 p.p.m. NiO and 1920 p.p.m. $V_2O_5$, reductions of 3 and 23%, respectively.

*Example II*

A sample of the same catalyst, 400–5010, was treated with a stream of equimolar $N_2/H_2S$ for 3 hours at 900° F. The cooled, jet-black product was leached with 0.75 M $NH_4Cl$ solution in the manner of Example I. Again, only the first filtrate contained Ni, all contained Fe. Analysis shows a reduction in NiO, $V_2O_5$ and Fe of 54%, 38% and 31%, respectively.

*Example III*

A sample of 400–5010 was treated in the manner of Example II, except that the sulfiding treatment was carried out for 3 hours at 1050° F. Reductions in NiO, $V_2O_5$ and Fe of 49%, 16% and 16% were realized.

*Example IV*

This duplicates Example II except that equimolar $H_2/H_2S$ was substituted for $N_2/H_2S$. The treatment resulted in reductions in NiO and Fe of 45% and 34% respectively. The analyst failed to obtain a $V_2O_5$ value due to some unidentified contaminant.

*Example V*

A sample of 400–5010 was treated with $H_2S$ for 16 hours, at 730° F., 310 p.s.i.g. $H_2S$, in a Pyrex-lined rocker bomb. Leaching with $NH_4Cl$ solution in the manner of Example II resulted in reductions in NiO, $V_2O_5$ and Fe of 29%, 45% and 20%, respectively.

*Example VI*

A 15 g. sample of 400–5010, sulfided in the manner of Example V, was slurried in 75 ml. of 0.7 molar $HNO_3$ for one hour at room temperature and washed until free of nitrate ion. The filtrate contained only a trace of Al, so no analysis was made for alumina loss. Analysis shows reductions in NiO and $V_2O_5$ of 20% and 50%, respectively.

*Example VII*

As Example VI except 0.04 M HCl was substituted for the $HNO_3$. Some Al was found in the filtrate. Analysis shows reductions in NiO, $V_2O_5$ and Fe of 16%, 32% and 25%, respectively.

The results of the analyses are given in Table II.

TABLE II

| Prepared As In Example | Sulfiding Conditions | | | | Leach Solution | Analytical Data | | |
|---|---|---|---|---|---|---|---|---|
| | P.s.i.g. | Gas | Time, Hrs. | Temp., ° F. | | P.p.m. NiO | P.p.m. $V_2O_5$ | Percent Fe |
| 5,010 | | | | | | 726 | 2,510 | 0.364 |
| I | | | | | 0.75 M $NH_4Cl$ | 705 | 1,920 | 0.388 |
| II | Atm | $H_2S/N_2$ | 3 | 900 | 0.75 M $NH_4Cl$ | 335 | 1,550 | 0.250 |
| III | Atm | $H_2S/N_2$ | 3 | 1,050 | 0.75 M $NH_4Cl$ | 371 | 2,110 | 0.307 |
| IV | Atm | $H_2S/H_2$ | 3 | 900 | 0.75 M $NH_4Cl$ | 398 | | 0.240 |
| V | 310 | $H_2S$ | 16 | 730 | 0.75 M $NH_4Cl$ | 515 | 1,390 | 0.292 |
| VI | 310 | $H_2S$ | 16 | 730 | 0.7 M $HNO_3$ | 582 | 1,248 | 0.370 |
| VII | 310 | $H_2S$ | 16 | 730 | 0.04 M HCl | 613 | 1,715 | 0.268 |

Example VIII

Although the art has stated that acid treatment of a catalyst after use in cracking a sulfur-containing metals contaminated hydrocarbon feedstock is effective in removing metals, the following examples show such treatment to be far less effective than when sulfiding is conducted outside the conversion system according to this invention.

A batch of regenerated catalyst was obtained which had been poisoned with metal contaminants from use in a commercial catalytic cracking unit using conventional fluidized catalyst techniques, including cracking and air regeneration at about 1100° F., to convert a feedstock (A) comprising a blend of Wyoming and Mid-Continent gas oils containing about 1.2 p.p.m. vanadium, about 0.3 p.p.m. nickel, about 1.0 p.p.m. iron and about 2 weight percent sulfur. This gas oil blend had a gravity (API) of 24°, a carbon residue of about 0.3 weight percent and a boiling range of about 500 to 1000° F. The base catalyst was a synthetic-gel type cracking catalyst containing about 25% $Al_2O_3$, the balance silica.

A portion of this regenerated catalyst was divided into samples 5112, 5114 and 5115. Sample 5112 was analyzed for metals content without further treatment. Samples 5114 and 5115 were each washed with an aqueous solution containing 10% HCl, sample 5114 being in contact with the solution for 2 minutes and sample 5115 for one hour. The treated samples analyzed as follows:

| Sample | 5112 | 5114 | 5115 |
|---|---|---|---|
| Fe, p.p.m. | 2,690 | 2,515 | 2,145 |
| NiO, p.p.m. | 306 | 307 | 303 |
| $V_2O_5$, p.p.m. | 3,759 | 3,402 | 2,814 |
| Percent $Al_2O_3$ | 26.1 | 26.0 | 21.4 |
| Metals Removal: | | | |
| Percent Fe | | 6.5 | 20.2 |
| Percent Ni | | | |
| Percent $V_2O_5$ | | 9.7 | 25.1 |
| Percent $Al_2O_3$ | | 0.04 | 18.0 |

Thus an acid wash without the sulfiding treatment of this invention is greatly inferior to the results obtained using sulfiding as shown, for example, in Sample VI, above, where 20% NiO and 50% $V_2O_5$ were removed without significant alumina loss.

Example IX

An aqueous solvent was formed by suspending 0.39 grams of Sequestrene AA (a free acid form of EDTA) in distilled water and adding the minimum amount (3 drops) of ammonium hydroxide required to effect solution. This solution was diluted and added to a sample of 400–5010 catalyst which had been sulfided in the manner of Example II. Analysis showed a reduction in NiO, $V_2O_5$ and Fe comparable to the quantities removed by the ammonium chloride leaches.

Example X

A regenerated, poisoned, 22% alumina "Nalcat" catalyst was obtained from the cracking procedure described in Example VIII. The sample had a poisoning metals content of 2880 p.p.m. Fe, 328 p.p.m. NiO and 4320 p.p.m. $V_2O_5$. A 200 gram sample is heated for about two hours at 1300° F. in a bed fluidized with air after which the catalyst is stripped with nitrogen. The stripped catalyst is then heated in a bed fluidized with hydrogen sulfide for one hour at 1175° F. The sulfided catalyst is cooled to 600° F. in inert gas and discharged into 800 ml. of an aqueous solution containing 3.52 g. ethylene diamine tetraacetic acid and 7 ml. concentrated $NH_4OH$ (1.82 g. $NH_3$). The resulting slurry is maintained at 200–210° F. with stirring while finely dispersed air is passed through the slurry for one hour. The slurry is then filtered, washed free of soluble metal compounds and returned to the catalytic cracking unit. Substantial reduction of all contaminating metals is obtained.

Examples XI to XIV

A poisoned catalyst was removed from the same commercial cracking operation described in Example VIII when the poisoning metals level had reached 2730 p.p.m. Fe, 326 p.p.m. NiO and 4438 p.p.m. $V_2O_5$. A batch of this base catalyst sample was used to test-crack a petroleum hydrocarbon East Texas gas oil fraction (feedstock B) having the following approximate characteristics:

| | |
|---|---|
| IBP (° F.) | 490–510 |
| 10% | 530–550 |
| 50% | 580–600 |
| 90% | 650–670 |
| EP | 690–710 |
| Grav. (API), deg. | 33–35 |
| Visc. (SUS) at 100° F. | 40–45 |
| Analine point, ° F. | 170–175 |
| Pour point, ° F. | 35–40 |
| Sulfur, percent | 0.3 |

The results of the cracking are given in Table III below.

The rest of the catalyst sample was heated in air for one hour at 1300° F. and sulfided with $H_2S$ for one hour at 1175° F. before being cooled and divided in four 100 gram batches. Batch XI was put into 400 ml. of an aqueous solution containing 1.76 grams EDTA (ethylene diamine tetraacetic acid) and 3.5 ml. concentrated (29%) $NH_4OH$. After removal of the catalyst from this solution, it was washed with tap water. Metals had been reduced to the levels shown in Table III. Samples XII, XIII and XIV, also shown in Table III, were treated similarly, except that air was bubbled into the basic chelating solution during contact with the catalyst. Also, sample XIII, after the chelation treatment was washed with dilute nitric acid after the chelating and aqueous wash. The results of the treatments are given in Table III. After treatment, batches XII, XIII and XIV were used for the test cracking of feedstock B, the results of which are also reported in Table III.

TABLE III

| Sample | Base | XI | XII | XIII | XIV |
|---|---|---|---|---|---|
| Chelating Solution: | | | | | |
| Grams EDTA | | 1.76 | 1.76 | 1.76 | 0.88 |
| Ml. $NH_4OH$ | | 3.5 | 3.5 | 3.5 | 3.5 |
| Air | | No | Yes | Yes | Yes |
| Metals Content: | | | | | |
| P.p.m. Fe | 2,730 | 2,475 | 2,490 | 2,480 | 2,510 |
| P.p.m. NiO | 326 | 144 | 125 | 131 | 120 |
| P.p.m. $V_2O_5$ | 4,438 | 3,388 | 3,237 | 3,206 | 3,215 |
| Metals Removal (percent): | | | | | |
| Fe | | 9.3 | 8.8 | 9.2 | 8.1 |
| NiO | | 55.9 | 61.6 | 59.8 | 63.2 |
| $V_2O_5$ | | 27.7 | 27.1 | 27.8 | 27.6 |
| Test Cracking: | | | | | |
| Wt. percent gasoline | 23.1 | | 25.0 | 25.0 | 25.7 |
| Wt. percent gas | 18.7 | | 17.1 | 18.1 | 19.8 |
| Wt. percent code | 3.5 | | 2.8 | 3.2 | 4.0 |
| Wt. percent conversion | 45.3 | | 44.9 | 46.3 | 49.5 |
| Relative Activity | 42.7 | | 37.6 | 40.4 | 47.5 |
| Distillate and Loss | 37.1 | | 34.6 | 36.0 | 39.1 |
| Gas Factor | 1.58 | | 1.30 | 1.32 | 1.20 |
| Coke Factor | 1.15 | | 0.94 | 1.00 | 1.07 |
| Gas Gravity | 1.10 | | 1.24 | 1.22 | 1.26 |

These results show the beneficial effects of the metal removal procedure of the invention on cracking results, such metals removal frequently giving greater activity to the catalyst and better products (gas gravity) as well as reducing unwanted side effects (coke factor).

It is claimed:
1. A method for the removal from a synthetic silica-based cracking catalyst of nickel contaminant, which contaminant was present in a petroleum feedstock which the catalyst was used to crack, which comprises sulfiding nickel contaminant on the catalyst in the absence of said petroleum feedstock and removing sulfide from the catalyst by contact with an aqueous solvent for the sufide consisting essentially of an aqueous solution of a complexing salt for the nickel.

2. The method of claim 1 where the sulfiding is performed by contact with hydrogen sulfide at an elevated temperature.

3. The method of claim 2 where the hydrogen sulfide is at a temperature of about 900 to 1200° F. and a $H_2S$ pressure of about 0.5–25 atmospheres.

4. The method of claim 1 wherein the solvent is a dilute solution of ammonium chloride.

5. The process of claim 1 wherein the solvent is a dilute solution of a salt of ethylenediamine tetraacetic acid.

6. A method for producing gasoline in a hydrocarbon cracking system having a catalytic cracking zone and a catalyst regeneration zone which comprises cracking, at elevated temperature in said cracking zone, a hydrocarbon feedstock heavier than gasoline and contaminated with a metal selected from the group consisting of nickel and vanadium, said cracking being conducted in the presence of a synthetic gel, silica-based hydrocarbon cracking catalyst and during which cracking the catalyst becomes contaminated with said selected contaminant of said hydrocarbon feedstock, cycling the catalyst between the cracking zone and the catalyst regeneration zone in which latter zone carbon is removed from the catalyst, bleeding a portion of the contaminated catalyst from the cracking system, sulfiding bled catalyst by preliminary contact with a sulfiding vapor at about 500–1500° F. to convert contaminating metal to sulfide, washing the catalyst with a basic aqueous solution containing ammonium ions and about 0.1 to 10% of a chelating agent for the contaminant, based on the weight of the calatyst, to remove said contaminant, and returning resulting decontaminated catalyst to the hydrocarbon cracking system.

7. The method of claim 6 in which the aqueous solution has a pH of about 8 to 11.

8. The method of claim 7 in which the ammonium ions are supplied by $NH_4OH$.

9. The method of claim 6 in which the chelating agent is an organic acid which contains nitrogen.

10. The method of claim 6 in which the solution has oxidizing characteristics.

11. The method of claim 6 in which the catalyst is silica-alumina.

12. A method for producing gasoline in a hydrocarbon cracking system having a catalytic cracking zone and a catalyst regeneration zone which comprises cracking, at elevated temperature in said cracking zone, a hydrocarbon feedstock heavier than gasoline and contaminated with nickel and vanadium, said cracking being conducted in the presence of a synthetic gel, silica-based hydrocarbon cracking catalyst and during which cracking the catalyst becomes contaminated with said contaminants of said hydrocarbon feedstock, cycling the catalyst between the cracking zone and the catalyst regeneration zone in which latter zone carbon is removed from the catalyst, bleeding a portion of the contaminated catalyst from the cracking system, converting a substantial amount of vanadium in the bled, regenerated catalyst to a higher valence state, to improve the subsequent removal of vanadium, by contact of the catalyst with a gas containing molecular oxygen at a temperature of at least about 1000° F., sulfiding the catalyst to convert contaminating metal to sulfide by contact with a sulfiding vapor at about 500 to 1500° F., contacting the treated catalyst with a basic aqueous solution containing ammonium ions sufficient to remove vanadium from the catalyst and about 0.1 to 10% of a chelating agent for the contaminants to remove said contaminants, and returning resulting decontaminated catalyst to the hydrocarbon cracking system.

13. The method of claim 12 in which the ammonium ions are supplied by $NH_4OH$.

14. The method of claim 12 in which the contact with gas containing molecular oxygen is at about 1150 to 1600° F.

15. The method of claim 14 in which the sulfiding is by contact with $H_2S$ at a temperature of about 800 to 1300° F.

16. The method of claim 12 in which the solution has oxidizing characteristics.

References Cited by the Examiner

UNITED STATES PATENTS

| | | | |
|---|---|---|---|
| 2,388,302 | 11/45 | Weyl | 252—411 X |
| 2,466,050 | 4/49 | Shabaker et al. | 208—120 |
| 2,494,556 | 1/50 | Hornaday | 252—413 X |
| 2,693,455 | 11/54 | Smith et al. | 252—414 |
| 2,754,273 | 7/56 | Shabaker | 252—413 X |
| 3,122,497 | 2/64 | Erickson | 208—120 |

ALPHONSO D. SULLIVAN, *Primary Examiner.*

JULIUS GREENWALD, *Examiner.*